United States Patent [19]

Schieve et al.

[11] Patent Number: 5,398,333
[45] Date of Patent: Mar. 14, 1995

[54] PERSONAL COMPUTER EMPLOYING RESET BUTTON TO ENTER ROM-BASED DIAGNOSTICS

[75] Inventors: Eric W. Schieve; Richard W. Finch, both of Austin, Tex.

[73] Assignee: Dell USA, L.P., Austin, Tex.

[21] Appl. No.: 34,056

[22] Filed: Mar. 22, 1993

[51] Int. Cl.⁶ .............................................. G06F 9/00
[52] U.S. Cl. .................... 395/575; 395/700; 364/280.2
[58] Field of Search ............ 395/575, 750, 700; 364/280.2, 280.3, 280.9

[56] References Cited

U.S. PATENT DOCUMENTS 5,291,585  3/1994  Sato et al. ........................... 395/500

*Primary Examiner*—Vincent P. Canney
*Attorney, Agent, or Firm*—David Hitt; James Huffman

[57] ABSTRACT

Disclosed are a system and method for providing user-invocable, non disk-based diagnostics routines for a personal computer. The method comprises the steps of (1) storing a diagnostics routine capable of performing diagnostic tests on portions of the personal computer in ROM, (2) monitoring a status of a reset button coupled to the personal computer and (3) executing the diagnostics routine if the reset button is pressed twice within a preselected period of time. The disclosed system and method allow a user to control the invocation of a diagnostics routine that needs a minimum of functioning computer hardware to execute.

21 Claims, 1 Drawing Sheet

PERSONAL COMPUTER EMPLOYING RESET BUTTON TO ENTER ROM-BASED DIAGNOSTICS

TECHNICAL FIELD OF THE INVENTION

The present invention is directed in general to embedded diagnostic routines for personal computers and, more specifically, to a procedure for invoking such routines with a conventional computer reset button.

BACKGROUND OF THE INVENTION

Diagnostics are software programs executed on a computer for the purpose of detecting and identifying faults in the computer hardware. The most common type of diagnostics is disk-based diagnostics. A disk-based diagnostic program is stored on either a hard or floppy disk and is retrieved from disk and executed by the computer's central processing unit ("CPU") under the control of the computer's operating system for the purpose of diagnosing the computer's hardware components.

The severe limitation in disk-based diagnostics is that, to load and execute the diagnostic program, the computer system needs at least a functioning disk drive, keyboard, CPU, main memory and video monitor. Therefore, disk-based diagnostics can only be invoked when essentially the entire computer system is functioning. However, the typical problems which would prompt one to invoke a diagnostic program to diagnose involve faults in the system that prevent the computer from starting up ("booting") in the first place. Thus, the computer cannot execute the disk-based diagnostics required to diagnose what is wrong with the computer: a seemingly insoluble Catch-22.

Another type of diagnostic program, rather than being disk-based, is embedded into the computer hardware (termed "firmware"). These are termed "embedded" or "ROM-based" diagnostics. The only diagnostic program of this type currently in use is a standard feature on most personal computers called power-on self-test ("POST") diagnostics, arranged in personal computers as a portion of the basic input/output system ("BIOS"). Such BIOS POST diagnostic programs are executed automatically and mandatorily when the computer system boots and at no other time, not allowing the computer user to control whether or when the diagnostic is executed.

Major limitations in execution speed and size of the actual code are placed on BIOS POST diagnostic programs. First, users want to flip the main power switch on their computer and have it boot, complete its diagnostic routines and be ready for their bidding very quickly. They do not want to wait for extensive component diagnostic testing to be performed. In addition, POST diagnostic programs reside in a 64K portion of the computer system's read-only memory ("ROM") BIOS and, because ROM BIOS must perform many other non-diagnostics functions, POST diagnostics are allocated only a small portion of that space. Therefore, one designing POST diagnostics has very little memory space available for code and is constrained to write very simple (and time-efficient) tests.

One prior art BIOS POST diagnostics routine offered in certain Hewlett-Packard personal computers represents a small variation on the above-described more traditional BIOS POST routine. If that routine finds a flaw in the computer system, then it will display ROM-resident trouble shooting flow charts. However, the user still has no control over the invocation of that routine, apart from rebooting the computer from scratch.

Another variation on the above is found in IBM 5100 systems. These systems provide a means of entering and exiting diagnostics with a series of keystrokes entered via the keyboard. Although the user can exit the diagnostics routines and resume normal operation, the diagnostics routines require the keyboard to function to be invoked. Therefore, the keyboard driver software within the operating system, the keyboard port, the keyboard and all intermediate buses must be fully functional to execute the diagnostics routines.

Thus, it is apparent that a need exists in the prior art for a ROM-based diagnostics program that 1) a user can specifically invoke at any time, 2) requires an absolute minimum of functioning hardware and software to execute and 3) does not require a reboot of the system to thereby detect faults that may prevent the system from fully booting.

SUMMARY OF THE INVENTION

It is therefore a primary object of the present invention to provide a ROM-based diagnostics routine for a personal computer requiring little hardware or software to execute that the user can invoke at any time without having to reboot the computer.

In the attainment of the above-noted primary object, the present invention provides a method of providing a user-invocable, non disk-based diagnostics routine for a personal computer. The method comprises the steps of: (1) storing a diagnostics routine capable of performing diagnostic tests on portions of the personal computer and (2) monitoring a status of a reset button and executing the diagnostics routine if the reset button is pressed twice within a preselected period of time, the personal computer being rebooted if the reset button is pressed only once within the preselected period of time. In the preferred embodiment of the present invention, the preselected period of time is less than or equal to 200 milliseconds.

For purposes of the present invention, "main memory" is defined as computer memory that is not accessed via peripheral devices (so-called "secondary storage" units, such as hard or floppy disk drives or tape drives). Thus "main memory" includes ROM, ROM BIOS, RAM, PROM, UV EPROM, EEPROM and other solid-state, non-peripheral memory storage.

Because the diagnostics routines are invocable at the user's option and not automatically upon booting, the boot process is not unduly protracted with execution of unnecessary comprehensive system diagnostics.

It is a further object of the present invention to use hardware that is already present in the personal computer, so cost is held to a minimum; software modifications only being necessary to effect the invention. Accordingly, the present invention makes use of the personal computer's existing hardware reset button, allowing the normally two-state (on/off) button to become a three-state (reset/diagnostics/off) button by means of monitoring the manner in which the button is pressed, i.e., temporal separation.

In the preferred embodiment of the present invention, the diagnostics routines are stored in electrically-erasable programmable ROM. This allows the routines to be modified without changing ROM chips. This also allows the routines to be stored in memory in a location other than BIOS, which is space-limited. In general, however, the present invention allows storage of the diagnostics routines anywhere in non-volatile memory.

Because the diagnostics routines are stored in main memory, rather than on disk, the routines need relatively few computer hardware resources to properly execute. Therefore, the personal computer may not be completely bootable. Even so, the diagnostic routines of the present invention can still be invoked and fully executed.

Another object of the present invention is to allow the diagnostics routines to take direction from and display results and findings to a user in a relatively user-friendly manner. Accordingly, it is within the scope of the present invention to provide for interaction with a user via a keyboard and a video monitor coupled to the CPU.

In the attainment of the above-described objects, the preferred embodiment of the present invention is a method of providing a user-invocable, non disk-based diagnostic routine for a personal computer, comprising the steps of: (1) detecting when a reset button coupled to the personal computer has been depressed, (2) initializing a timeout counter with a preselected value representing a preselected period of time within which the reset button must again be depressed to invoke the diagnostics routine, (3) pausing to detect a second depression of the reset button until the timeout counter times out, (4) executing the diagnostics routine if the reset button is depressed a second time before the timeout counter times out and (5) rebooting the personal computer if the timeout counter times out without the reset button having been depressed the second time. The diagnostics routine is capable of interacting with a user via a video monitor coupled to the CPU and may be capable of taking direction from the user via a keyboard coupled to the CPU.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
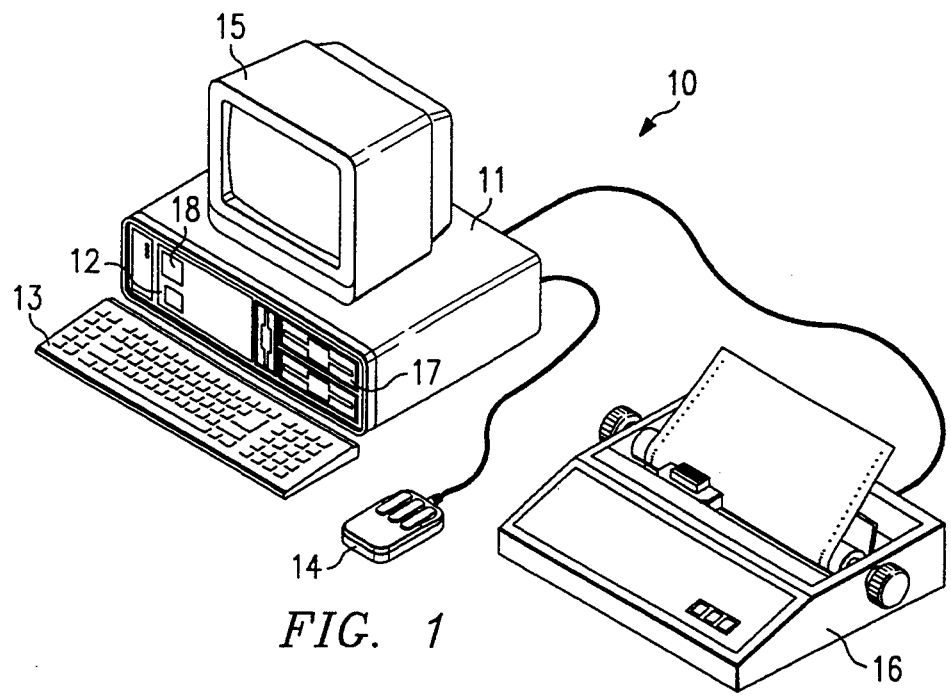
FIG. 1 illustrates a personal computer that provides an environment within which the present invention operates.

Turning now to FIG. 1, illustrated is personal computer 10 that provides an environment within which the present invention operates. Personal computer 10 comprises main chassis 11 containing computer hardware that will be shown and discussed in more detail with regard to FIG. 2. Main chassis 11 features, among other things, reset button 12, which is a single pole momentary switch used to signal a CPU and other components (e.g. memory and I/O controllers, not shown) within personal computer 10 to reboot, thereby providing a hardware means (not relying on operating system or other software) of rebooting computer 10. Coupled through individual ports on main chassis 11 are keyboard 13, mouse 14 and video monitor 15. Printer 16 is also shown coupled to main chassis 11. Peripheral devices 13, 14, 15, 16 allow personal computer 10 to interact with a user. In the specific context of the present invention, peripheral devices 13, 14, 15, 16 are preferably also the subject of specific diagnostic tests. In the preferred embodiment, the present invention takes direction from the user solely via the reset button 12, although it is well within the scope of the invention to allow the user to communicate with the routines via the keyboard 13 once the routines have been invoked.

Finally, main chassis 11 is shown as including disk drive 17. Disk drive 17 (another peripheral device), although crucial to disk-based diagnostics, is limited in its role with respect to embedded diagnostics to being a subject for a specific diagnostics test or, perhaps, a further means by which to store diagnostic test results for later analysis. Hidden within main chassis 11 is a power supply that provides power to computer 10.

Figure 2:
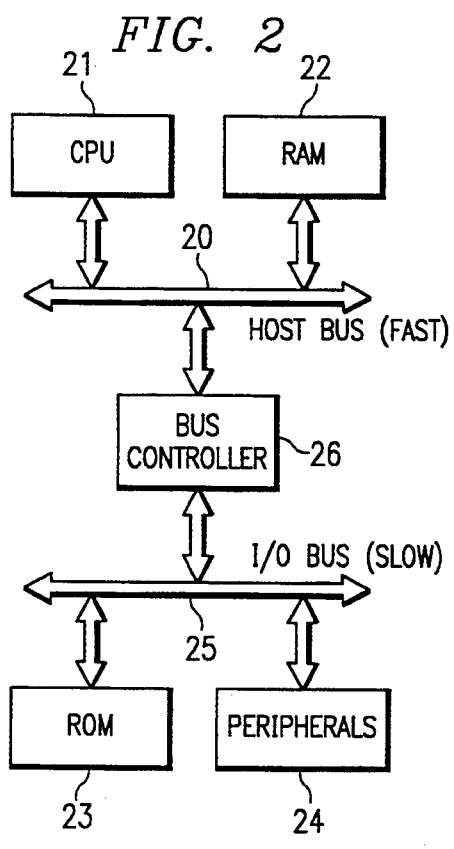
FIG. 2 illustrates a top-level diagram of computer hardware within the main chassis of FIG. 1.

Turning now to FIG. 2, illustrated is a diagram of computer hardware within main chassis 11 of FIG. 1. Shown is a host bus 20. Coupled to host bus 20 are CPU 21 and random access memory ("RAM") 22. An I/O bus 25 is coupled to a ROM 23 and peripheral ports 24. Peripheral ports 24 couple I/O bus 25 to peripheral devices 13, 14, 15, 16, 17 of FIG. 1 for communication therewith. Finally, a bus controller 26 couples host bus 20 and I/O bus 25 to provide a path for and manage communication therebetween. The host bus 20 is relatively fast to facilitate rapid communication between CPU 21 and RAM 22 and is burdened with as few components as possible to maximize its speed. I/O bus 25 is allowed to run at a slower pace because its speed is less critical. Of course, the present invention can function within an architecture that only has a single bus.

One of the key advantages in the diagnostic program of the present invention is that it is embedded in the computer's ROM 23 and does not therefore require that computer system 10 be fully bootable to be executed. Thus, one or more of peripheral ports 24 or associated peripheral devices 13, 14, 15, 16, 17 may not be functioning. If, however, host bus 20, I/O bus 25, bus controller 26, CPU 21, ROM 23 and power supply (not shown) are functioning, the diagnostics routines can be executed, although their ability to communicate with the user may be hampered by lack of operation of one or more peripheral devices (especially the video monitor 15).

Although FIG. 2 shows ROM 23 for storing the embedded diagnostics of the present invention, the embedded diagnostics may reside in a standard EEPROM, a flash EEPROM, or a standard ultraviolet eraseable programmable ROM ("UV-PROM"). In fact, the diagnostics can be embedded in RAM (typically complementary metal oxide semiconductor ("CMOS") RAM), so long as the RAM retains the diagnostics when the computer is otherwise powered down. ROM 23 may be ROM BIOS, although, as previously noted, code space in ROM BIOS is small. In any event, the present invention is especially suitable for detecting system faults that prevent the system from booting, when the user is unable to access disk-based software.

Figure 3:
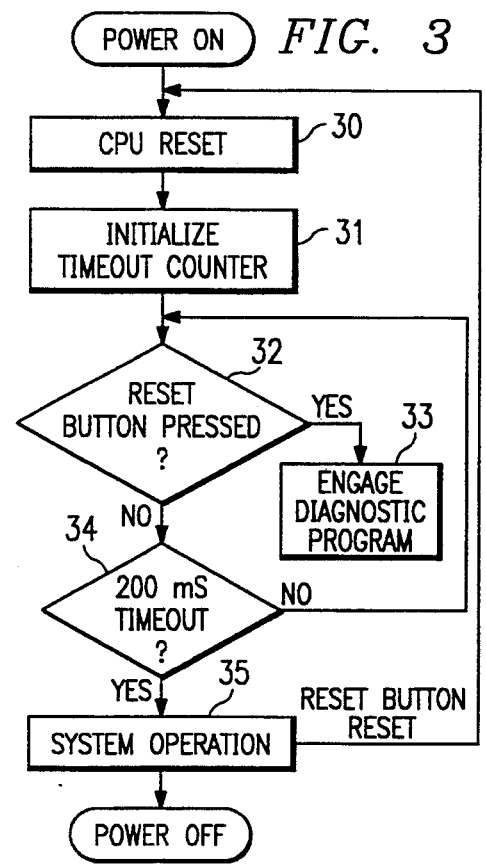
FIG. 3 illustrates a flow chart for use of a reset button on the personal computer to enter a ROM-based diagnostics routine.

Another major advantage of the present invention is that it is intentionally invoked by the user by pressing reset button 12, in a manner to be more thoroughly described with respect to FIG. 3, to initiate an extended set of ROM-based diagnostics. Therefore, there are no time restraints on execution speed of the diagnostics. The diagnostics routines can be as comprehensive as needed.

With regard to the implementation of the ROM-based diagnostic program, the present invention allows for the use of existing hardware to enter the ROM-based diagnostics routines and thus provides a zero cost entry method. The preferred embodiment of the present invention uses reset button 12 to set a switch that BIOS can detect very early in its reset process. Detection is effected by placement of a relatively small interception and timing routine in BIOS as will be shown in FIG. 3. That interception and timing routine detects a request on the user's part to invoke embedded diagnostics and vectors CPU 21 to execute diagnostics, whether, in fact, the diagnostics routines are stored in BIOS or elsewhere. In addition, the preferred embodiment requires no modification of the reset circuitry hardware. Therefore, the ROM-based diagnostics do not appreciably delay POST execution in the event diagnostics are not requested.

FIG. 3 illustrates a flow diagram for use of reset button 12 to enter ROM-based diagnostics. The diagram shows two types of hard reset. One type ($T_0$) is engaged when the system is first powered up, while the other ($T_1$) is entered by pressing reset button 12 when the system is already running. This arrangement is conventional.

When reset button 12 is initially pressed, the system enters CPU reset state 30. From CPU reset state 30, the system initializes a timeout counter in step 31, performed by executing an interception and timing routine located in ROM BIOS. As part of that routine, the system enters a 200 millisecond time-out loop that tests for reset button 12 being pressed. Most human beings can double press a reset button within 200 milliseconds, even humans with fairly slow reflexes. That is the reason for the 200 millisecond time.

Although the present invention defines the period within which reset button 12 must be again pressed to enter diagnostics as 200 milliseconds in its preferred embodiment, those skilled in the art will realize that a shorter or longer (e.g. 1 second) period may be desirable. However, should the user not want to enter diagnostics and, instead, wish to simply boot the computer, the system must nonetheless wait for the time-out loop to end before proceeding; long loops become undesirable for that reason.

If reset button 12 is pressed within this 200 millisecond loop (as determined in step 32), the ROM-based diagnostic program is engaged (in step 33). If reset button 12 is not pressed within this 200 millisecond loop (step 34), the system simply continues on to execute normal BIOS POST and system operation (step 35).

From a hardware perspective, reset button 12 is a debounced switch. Thus, reset button 12 provides a single pulse from a down and up press. When reset button 12 is pressed, a non-maskable interrupt is sent to CPU 21. An I/O bit is set and a 10 ms hardware delay is initiated. If software does not disable reset circuitry within the 10 ms delay, a reset signal is sent to the CPU and other components within the system, changing the system to a reset state. The present invention begins to operate in that 10 millisecond window, detecting the reset and then immediately setting a second bit that blocks the reset from actually being generated from the button circuit. The reset, if it happens, is detected by a bus controller (not shown, but coupled to bus 20 of FIG. 2) in the system. The bus controller then signals the various system components to reset by activating a hard reset line to the majority of the hardware components in the system. Thus, this is not a CPU-only reset.

From the above description, it is evident that the present invention provides a user-invocable, non disk-based diagnostic routine for a personal computer comprising main memory within the personal computer, the main memory storing a diagnostics routine capable of performing diagnostic tests on portions of the personal computer and a microprocessor CPU coupled to the main memory and within the personal computer, the CPU monitoring a status of a reset button coupled to the CPU, the CPU executing the diagnostics routine when the reset button is pressed twice within a preselected period of time, and the CPU rebooting the personal computer when the reset button is pressed only once within the preselected period of time.

Although the present invention and its advantages have been described in detail, it should be understood that various changes, substitutions and alterations can be made herein without departing from the spirit and scope of the invention as defined by the appended claims.

What is claimed is:

1. A system for providing a user-invocable, non disk-based diagnostic routine for a personal computer, comprising:

main memory within said personal computer, said main memory storing a first diagnostics routine capable of performing diagnostic tests on portions of said personal computer; and a microprocessor CPU coupled to said main memory and within said personal computer, said CPU monitoring a status of a reset button coupled to said CPU, said CPU executing said first diagnostics routine when said reset button is pressed twice within a preselected period of time, said CPU rebooting said personal computer and executing a second diagnostics routine when said reset button is pressed only once within said preselected period of time.

2. The system as recited in claim 1 wherein said preselected period of time is less than or equal to one second.

3. The system as recited in claim 1 wherein said preselected period of time is less than or equal to 200 milliseconds.

4. The system as recited in claim 1 wherein said first diagnostics routine is stored in read-only memory (ROM).

5. The system as recited in claim 1 wherein said first diagnostics routine is stored in electrically-eraseable programmable ROM.

6. The system as recited in claim 1 wherein said first diagnostics routine is capable of interacting with a user via a keyboard and a video monitor coupled to said CPU.

7. A system for providing a user-invocable, non disk-based diagnostic routine for a personal computer, comprising:
    means for storing a first diagnostics routine capable of performing diagnostic test on portions of said personal computer; and
    means, coupled to said storing means, for monitoring a status of a reset button and executing said first diagnostics routine when said reset button is pressed twice within a preselected period of time, said monitoring means rebooting said personal computer and executing a second diagnostics routine when said reset button is pressed only once within said preselected period of time.

8. The system as recited in claim 7 wherein said preselected period of time is less than or equal to one second.

9. The system as recited in claim 7 wherein said preselected period of time is less than or equal to 200 milliseconds.

10. The system as recited in claim 7 wherein said first diagnostics routine is stored in read-only memory (ROM).

11. The system as recited in claim 7 wherein said first diagnostics routine is stored in electrically-eraseable programmable ROM.

12. The system as recited in claim 7 wherein said first diagnostics routine is capable of interacting with a user via a keyboard and a video monitor coupled to said personal computer.

13. A method of providing a user-invocable, non disk-based diagnostic routine for a personal computer, comprising the steps of:
    storing a first diagnostics routine capable of performing diagnostic tests on portions of said personal computer;
    storing a second diagnostics routine on said personal computer;
    monitoring a status of a reset button coupled to said personal computer;
    executing said first diagnostics routine when said reset button is pressed twice within a preselected period of time; and
    executing said second diagnostic routine when said reset button is pressed once.

14. The method as recited in claim 13 wherein said preselected period of time is less than or equal to one second.

15. The method as recited in claim 13 wherein said preselected period of time is less than or equal to 200 milliseconds.

16. The method as recited in claim 13 wherein said first diagnostics routine is stored in read-only memory (ROM).

17. The method as recited in claim 13 wherein said first diagnostics routine is stored in electrically-eraseable programmable ROM.

18. The method as recited in claim 13 wherein said first diagnostics routine is capable of interacting with a user via a keyboard and a video monitor coupled to said personal computer.

19. A method of providing a user-invocable, non disk-based diagnostic routine for a personal computer, comprising the steps of:
    detecting when a reset button coupled to said personal computer has been depressed;
    initializing a timeout counter with a preselected value representing a preselected period of time within which said reset button must again be depressed to invoke said diagnostics routine;
    pausing to detect a second depression of said reset button until said timeout counter times out;
    executing said diagnostics routine if said reset button is depressed a second time before said timeout counter times out; and
    rebooting said personal computer if said timeout counter times out without said reset button having been depressed said second time.

20. The method as recited in claim 19 wherein said diagnostics routine is capable of interacting with a user via a keyboard and a video monitor coupled to said personal computer.

21. A computer system, comprising:
    read-only memory within said system for storing embedded diagnostics routines;
    a reset button capable of transmitting a signal to a reset circuit within said system when said button is depressed;
    a timeout counter, coupled to said circuit, capable of being initialized and decremented to count a preselected period of time, said system (1) executing said diagnostics routines if said button is depressed a second time within said preselected period of time and (2) initiating a hardware reset of said system if said preselected period of time passes without said button having been depressed said second time;
    a CPU, coupled to said read-only memory and said circuit, capable of accessing said read-only memory to retrieve and execute said embedded diagnostics routines if said button is depressed said second time within said preselected period of time;
    a video monitor coupled to said CPU capable of displaying information to a user concerning operation of said diagnostics routines; and
    a bus controller within said system and coupled to said CPU for setting said CPU and other components within said system to a reset state when said preselected period of time passes without said button having been depressed said second time.

* * * * *